United States Patent

Trammell

[15] 3,649,773

[45] Mar. 14, 1972

[54] RECORDING HEAD ADJUSTMENT MECHANISM

[72] Inventor: James R. Trammell, Parma Heights, Ohio

[73] Assignee: Scanfax Systems Corporation, New York, N.Y.

[22] Filed: Mar. 12, 1970

[21] Appl. No.: 18,939

[52] U.S. Cl. ....................179/100.2CA, 274/4 A, 274/11 A

[51] Int. Cl. ....................................G11b 5/56, G11b 21/24

[58] Field of Search................179/100.2 CA; 274/4 A, 11 A

[56] References Cited

UNITED STATES PATENTS

| | | | |
|---|---|---|---|
| 3,310,791 | 3/1967 | Fischer | 179/100.2 CA |
| 3,373,248 | 3/1968 | Baybick et al. | 179/100.2 CA |

*Primary Examiner*—Bernard Konick

*Assistant Examiner*—J. Russell Goudeau

*Attorney*—Amster and Rothstein

[57] ABSTRACT

The recording head is positioned between two spaced platforms, the spacing on one side of the head being fixed by a sleeve and bolt arrangement and the spacing on the other side of the head being adjustable.

1 Claims, 9 Drawing Figures

INVENTOR
James R. Trammell
BY Amster + Rothstein
AMSTER & ROTHSTEIN
ATTORNEYS

INVENTOR
James R. Trammell
BY Amster & Rothstein
AMSTER & ROTHSTEIN
ATTORNEY

RECORDING HEAD ADJUSTMENT MECHANISM

RECORDING HEAD ADJUSTMENT MECHANISM

This invention relates primarily to tape recording systems and more particularly to recording head alignment mechanisms for use therewith.

The present invention is particularly useful with an apparatus and method for the preparation and transmission of audio information from an original location to a first remote location (normally a library or other convenient depository) and then in multiple copies of such audio information, the dissemination thereof to a plurality of further remote locations. To more particularly describe this method of information flow, the contemplated origin location is a recording studio with the necessary recording equipment for reproducing audio information onto master tapes. The audio information which is recorded may be in the form of a lecturer reading from a written manuscript, or the like. Following the recording of individual master tapes at the recording studio, the tapes are packaged in protective cassettes and placed in a convenient depository (such as a library) so that at a later time the information of the master tapes can be reproduced onto so-called "slave" tapes at extremely high recording speeds. A recording system capable of accommodating at least one and preferably more "slave" tapes in cassettes is provided for recording at such high speeds the program of a selected master tape at the depository (library). Such a system enables wide dissemination of audio information. The "slave" recordings are produced in cassettes and may then be played back at further remote locations.

The invention, as described herein, is particularly useful in a recording system for producing multiple "slave" tape recordings from a master at the depository. It is convenient, during such production of "slave" tape recordings, that means be provided for operating at extremely high recording speeds, since it is unnecessary during such operation that the operator or others be able to hear the recording. The high speeds allow for satisfaction of the objectives of the system, i.e., to provide for the widest possible dissemination of the information. Also at the library location, it is beneficial to eliminate the necessity for recording head adjustments by unskilled personnel.

Accordingly, a primary object of the present invention is to provide an efficient and reliable means by which operation during "slave" tape recording may be at extremely high speeds without the possibilities of recording head wear, distortion and loss of high-frequency response due to head misalignment.

A further object of the present invention is to provide a recording head adjustment mechanism and method by which recording head adjustments can be made at the factory and fixed at that point to prevent tampering by unskilled personnel.

These and other objects of the present invention are accomplished in accordance with one illustrative embodiment of the present invention wherein a recording head is provided for a high-speed recording system with a physical arrangement including a first upper stable platform, a second lower stable platform with the recording head affixed thereto, a first sleeve and first bolt providing fixed separation of the stable platforms on one side of the recording head and a second adjustable sleeve and bolt with a spring for adjusting the azimuth of the recording head on the other side of the recording head. A spring on the second sleeve and bolt is used with the bolt thereof for making adjustments of the azimuth at the factory for the recording equipment, and at that same location, a potting compound or the like is used to fix the position of the spring and bolt and thereby the separation of the stable platforms at the location of the second sleeve and bolt. The recording head and adjustment mechanism are mounted at the base of a receptacle defined by a cassette-receiving module. At the recording location, the cassette is inserted to the receptacle to bring the tape to the recording head so that no motion of the recording head is required which might affect the alignment attained at the factory.

The above brief description, as well as further objects, features and advantages of the present invention will be more fully appreciated by reference to the following detailed description of the preferred, but nonetheless illustrative embodiment when taken in conjunction with the accompanying drawings, wherein.

In any recording system, the alignment of the recording head, particularly a two-track head, in relation to the direction of motion of the recording tape is critical since either a moving or misaligned head would be more subject to possible distortion errors and wear during a recording operation. Also, in very high-speed recording operations such as are contemplated by use of the present system, any movement or misalignment of the head is critical and damaging relative to the ability of the recording head to accurately record high-frequency signals. In a recording system, such as described herein, it is not unusual for operation frequency to reach 40,000 cycles per second in order to obtain a high order of reproduction rate for the recorded material to facilitate wider dissemination of the information.

In standard recording equipment, it is not unusual to mount the recording heads on a pivoting mechanism in order to provide ease of adjustment thereof. Such equipment is subject to the problems of distortion and loss of high-frequency response mentioned above due to motion during operation.

Figure 1:
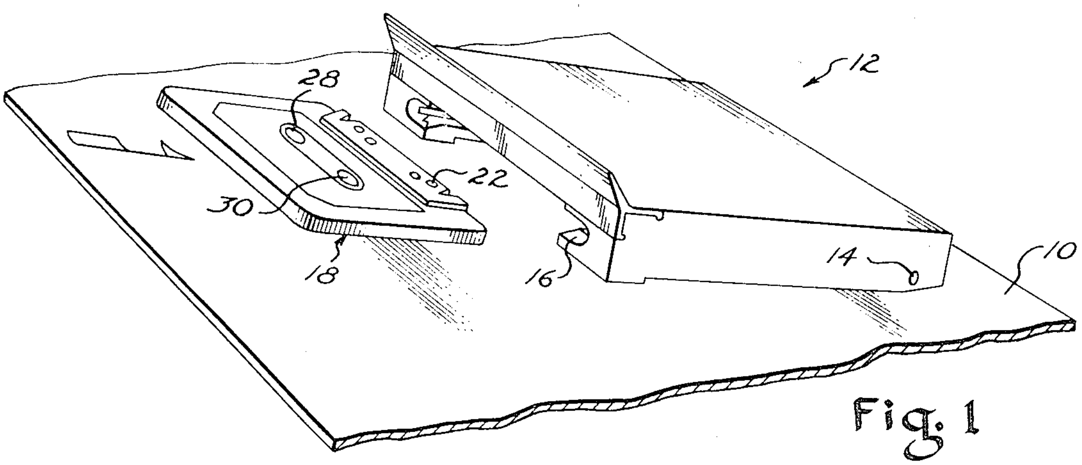
FIG. 1 is a perspective view of a cassette-receiving module rotatably affixed to an operational panel, and a cassette for use therewith.

Referring specifically to the drawings, and in particular FIG. 1, a recording system and equipment is shown to include, particularly for the "slave" recording mechanism, an operational panel 10 having mounted thereon a cassette-receiving module, generally designated 12. The mounting of the cassette-receiving module is accomplished rotationally by means of a shaft 14, which is fixed relative to the operational panel 10 and rotatable relative to the cassette-receiving module 12. The module 12 is constructed to define a receptacle 16 for receiving therein a cassette, generally designated 18, which houses the "slave" recording tape. Insertion of the cassette 18 to the cassette-receiving module receptacle 16 is intended to occur only when the cassette-receiving module has been angularized with respect to the operational panel 10. Such a loading arrangement is provided particularly to insure insertion of capstan shafts 20 (FIG. 3) to capstan-receiving openings 22, defined by the cassette 18. Furthermore, the loading arrangement facilitates entry of tape spindles 24, 26 (FIG. 2) to the spindle-receiving openings 28, 30 defined by the cassette 18. After loading of the cassette 18 to the cassette-receiving module 12, the module 12 is deangularized with respect to the operational panel 10 and the capstan shafts 20 and spindles 24,26 are inserted to the cassette 18 for proper driving relationship with the tape therein.

Figure 2:
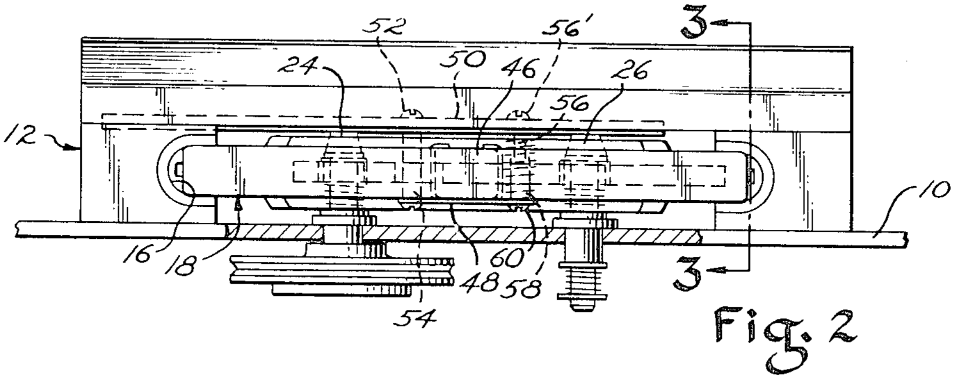
FIG. 2 is a front, partially sectional view of a cassette-receiving module with a cassette inserted thereto in operational position with respect to the operational panel for the system.
Figure 3:
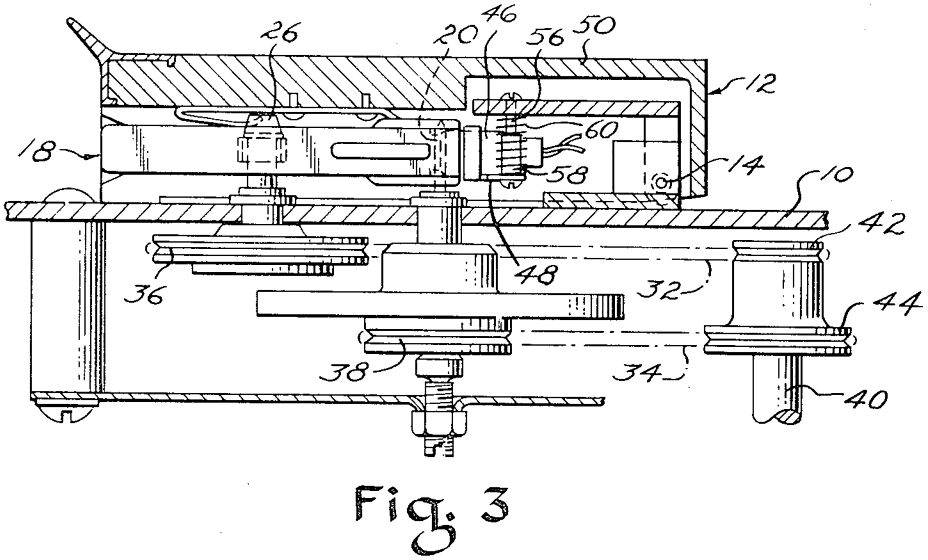
FIG. 3 is a side sectional view taken along the line 3—3 of FIG. 2 showing particularly the relationship between the recording head and tape in the cassette.

FIGS. 2 and 3 illustrate the driving mechanism for both capstan shafts and tape spindles as including a pair of belts 32, 34, a spindle pulley 36, a capstan pulley 38, a main drive shaft 40 and main drive shaft pulleys 42, 44. Also shown in FIGS. 2 and 3 are the arrangement for the recording head 46 and the adjustment mechanism therefor. The adjustment mechanism for the recording head includes a first lower stable platform 48, a second upper stable platform 50, a first bolt 52, a first sleeve 54 for providing a fixed separation between the platforms on one side of the recording head 46, a second bolt 56, a second sleeve 58 and an adjustment spring 60 for providing adjustable separation between the stable platforms on the other side of the recording head.

Figure 4:
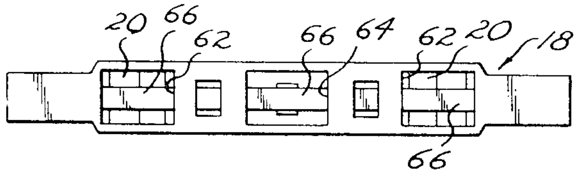
FIG. 4 is a back view of the cassette, showing particularly the openings defined by the cassette for exposing the tape to the recording head and to the tape-driving mechanism.

FIG. 4 illustrates the back side (leading edge during loading) of the cassette 18 which defines openings 62 and 64 therein, the openings 62 providing for exposure of the tape 66 to the pinch roller 68 (FIG. 5), so that the tape 66, during operation, is wedged between the capstan shaft 20 and the pinch roller 68. The opening 64 exposes the tape 66 to the recording head 46.

Figure 5:
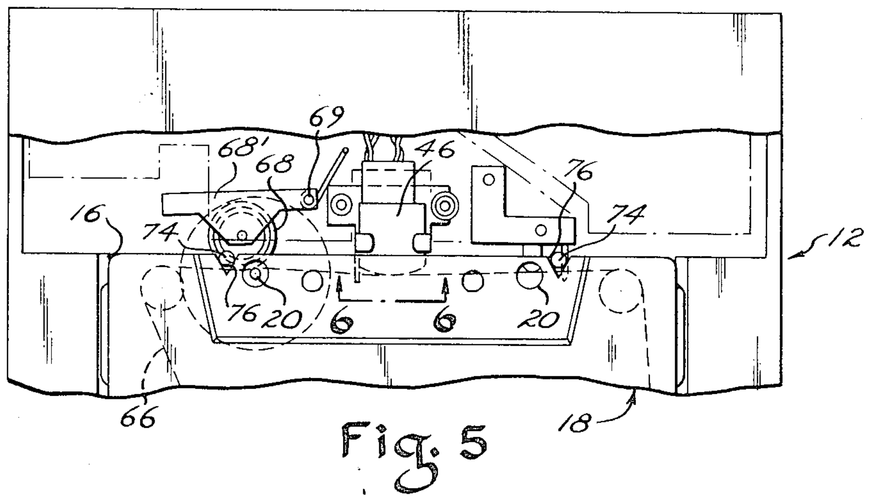
FIG. 5 is a top, partially broken away view of the cassette-receiving module with the cassette inserted thereto.
Figure 6:
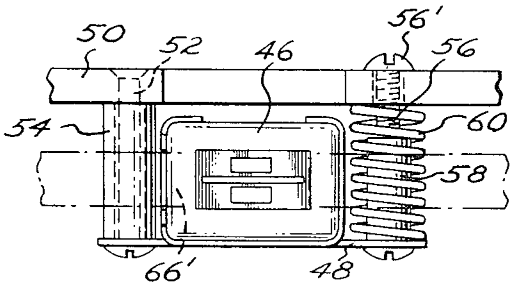
FIG. 6 is a front view of the recording head and its adjustment mechanism.
Figure 7:
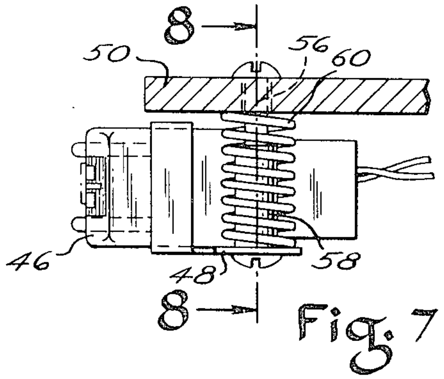
FIG. 7 is a right side view of the recording head and mechanism of FIG. 6.

The drawing of FIG. 5 illustrates the particular construction of the pinch roller mechanism including pinch roller 68 and pinch roller channel 68' which are mounted such that at a predetermined part of the loading sequence, the pinch roller is rotated on its rotatable mount 69 to operative engagement with the tape 66. In this way, neither the recording head 46 nor the tape need be moved in the loading process to maintain the proper alignment therebetween established at the manufacturing facility for the recording system. The mechanism for sequencing the rotation of pinch roller channel 68' into operative engagement with the tape 66 is not shown, but the completion of the sequence requires bottoming of the tape cassette 18 in the receptacle 16 of the cassette-receiving module 12. To facilitate such bottoming of "slave" tape cassettes only (rather than master tape cassettes, to avoid over-recording), notches 76 are provided in the "slave" tape cassettes only (and not in master cassettes) and are matable with locating pins 74 at the bottom of the receptacle.

Figure 8:
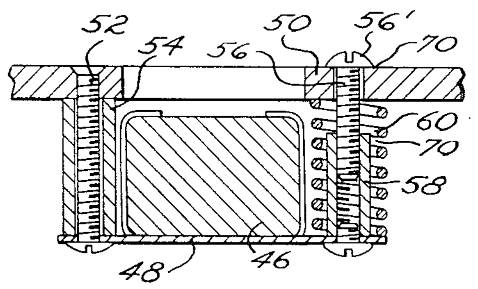
FIG. 8 is a front sectional view taken along the line 8—8 of FIG. 7.
Figure 9:
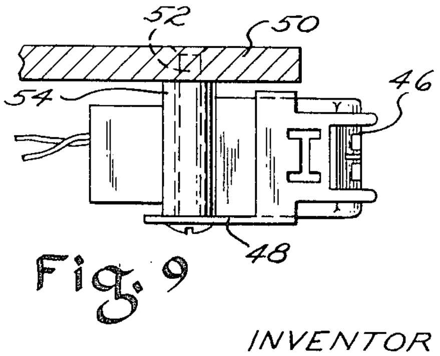
FIG. 9 is a left side view of the recording head an adjustment mechanism of FIG. 6.

To more completely describe the adjustment operation and mechanism for the recording head, particular reference is made to FIGS. 6 through 9 which show, in exploded views, a first lower stable platform 48 and a second upper stable platform 50. The recording head 46 is attached to the first lower stable platform 48 and the second upper stable platform 50 is fixed relative to the cassette-receiving module receptacle 16. On one side of the recording head 46 a first bolt 52 and a first sleeve 54 are used to maintain fixed connection of, and proper separation between, the first and second stable platforms. On the other side of the recording head 46, a second bolt 56 and a second sleeve 58 are used, in cooperation with spring 60, to both provide an adjustment capability for the azimuth of the head 46 and to maintain the adjusted spacing between the stable platforms 48, 50. At the manufacturing facility for the recording mechanism, adjustment of the azimuth alignment of recording head 46 is accomplished by turning the bolt head 56' until the recording head 46 is aligned relative to a testing tape 66' (FIG. 8). The determination of proper alignment may be made by such techniques as those available for determining acceptable recording capability for high frequency, by direct measurement, or the like. When the alignment is deemed satisfactory, a potting compound 70, or the like, is used between coils of the spring 60 and beneath the bolt head 56' (see FIG. 8). By so fixing the adjustment, tampering or attempted adjustment at the user location is prevented.

By such means as has been shown and described, a factory-adjusted azimuth orientation for a recording head relative to tape motion is provided in a simple and economical, yet reliable, manner to insure desired lack of distortion, high-frequency response, and prevention of movement of the recording head during operation of the recording system at extremely high frequencies.

What is claimed is:

1. A recording head azimuth factory adjustment mechanism for use with a recording head in a cassette-receiving module for magnetic tape in a tape cassette comprising, in combination, a cassette-receiving module, a first, lower platform, a second, upper platform, said recording head being attached to one of said platforms and between said platforms, the other of said platforms being fixed relative to said module and said platforms each being in a plane generally parallel to the direction of motion for said tape, a first means for connecting said platforms at one side of said recording head, said first means including a first bolt extending through one of said platforms and through a first sleeve for threadable attachment to the other of said platforms, said sleeve being arranged between said platforms for maintaining them a fixed distance apart, and a second adjustable means at the other side of said recording head, said second adjustable means including a second bolt having a bolthead extending through one of said platforms and a spring surrounding said bolt and adapted to provide for adjustment of the azimuth of said recording head by the turning of said bolthead, said second adjustable means further including a potting compound beneath said bolthead for fixing said adjustment.

* * * * *